United States Patent
Lewis

[11] 3,922,481
[45] Nov. 25, 1975

[54] OPEN CONFIGURATION MIDSPAN ELECTRICAL CONDUCTOR SPACER

[75] Inventor: Paul E. Lewis, Mexico, Mo.

[73] Assignee: A. B. Chance Company, Centralia, Mo.

[22] Filed: Oct. 18, 1974

[21] Appl. No.: 515,864

Related U.S. Application Data

[62] Division of Ser. No. 340,323, March 12, 1973, Pat. No. 3,867,566.

[52] U.S. Cl. .................. 174/146; 403/97; 403/170
[51] Int. Cl.² ............................................ H02G 7/12
[58] Field of Search............ 174/40 R, 42, 146, 148, 174/149 R, 161 R; 24/73 A, 81 AD, 81 AE, 81 CC, 132 CS; 403/97, 170, 217, 219

[56] References Cited
UNITED STATES PATENTS

| | | | |
|---|---|---|---|
| 602,625 | 4/1898 | LaFave | 403/97 X |
| 2,555,226 | 5/1951 | Draughn | 403/97 X |
| 3,095,471 | 6/1963 | Price | 174/146 X |
| 3,510,998 | 5/1970 | Cianflone | 403/97 X |
| 3,585,277 | 6/1971 | Lewis | 174/146 |
| D204,456 | 4/1966 | Mason | 174/146 UX |

FOREIGN PATENTS OR APPLICATIONS

| | | | |
|---|---|---|---|
| 121,705 | 3/1931 | Austria | 174/42 |
| 1,421,991 | 11/1965 | France | 174/146 |
| 1,563,904 | 3/1969 | France | 174/146 |

*Primary Examiner*—Laramie E. Askin
*Attorney, Agent, or Firm*—Schmidt, Johnson, Hovey & Williams

[57] ABSTRACT

An adjustable midspan spacer of open configuration is provided for maintaining a plurality of high voltage, multiple phase electrical conductors in proper relative relationship under varying ambient weather and wind conditions. The spacer is a generally planar assembly positionable within the area between proximal conductors and includes a plurality of spacer bars joined by adjustable connection structure at a central hub point and extending outwardly therefrom to grippingly engage the respective conductors. The connection structure permits selective adjustment of the individual spacer bars in the field as required to conform the spacer to a particular arrangement or pattern of conductors. In preferred forms, the connection structure includes transversely apertured, toothed connection ferrules integrally attached to the innermost ends of the separate spacer bars, with the respective ferrules being in complementally meshed, locked relationship to restrict untoward relative rotation of the bars, while being releasable to allow selective adjustment thereof as required.

6 Claims, 7 Drawing Figures

OPEN CONFIGURATION MIDSPAN ELECTRICAL CONDUCTOR SPACER

This application is a division of application Ser. No. 340,323, filed on Mar. 12, 1973, now U.S. Pat. 3,867,566.

This invention relates to high voltage power transmission equipment and especially to spacers for maintaining adjacent high voltage conductors of a multiple phase transmission line in spaced relationship at midspan. More particularly, it relates to a an open configuration spacer that is capable of maintaining a plurality of proximal conductors in proper spatial relationship and is adjustable at the site of use to permit utilization thereof in a variety of situations.

Overhead electric power lines are normally required to span relatively long distances between supporting poles or towers therefor. Such lines are commonly referred to as "transmission" or "distribution" lines, depending upon the line voltage carried thereby. In all cases however, the drape or sag of such lines between supporting structures varies according to the standards of a particular power company and the terrain over which it is erected. In order to assure adequate safety of operation, this drape is generally very carefully calculated in every instance.

Wind-induced vibration is a persistent operating hazard of overhead transmission lines, and a particularly troublesome and dangerous category of wind-induced line movements has traditionally been called "galloping". Although galloping transmission lines are not encountered during normal weather and atmospheric conditions, inclement cold weather which results in buildup of ice on the lee side of a conductor can cause a crude airfoil which, in conjunction with the torsional response of the conductor, can produce a varied assortment of violent wave motions. Conductors can actually touch or move toward each other to an extent to cause phase-to-phase arcing. This problem has been amplified in recent years because of the introduction of bundle conductor systems, since the latter have been observed vibrating in large amplitudes even when no ice was present.

An exemplary midspan conductor spacer of the prior art is shown in co-owned U.S. Pat. No. 3,585,277 wherein a single integral bar spacer is provided for maintaining a pair of adjacent conductors in spaced relationship. Although the assembly shown in that patent is extremely effective in maintaining a pair of conductors in a spaced relationship, it is not effectively usable when a multiplicity of conductors need to be kept relatively spaced.

Another problem encountered with the spacers of the prior art has been their integral nature and lack of adjustability in the field. As can be appreciated, in various situations it may be desirable to adjust the relative positions of the conductor-gripping clamps of the spacer assembly in the field at the site of use to compensate for particular spacing requirements at given points. In this way the exact spatial configuration of the conductors can be met with a single spacer unit. Otherwise, the spacer assemblies would either be useless in many situations or require readjustment of the transmission lines themselves in order to conform the latter to the predetermined spacing dimensions of the assembly.

A related problem of integral nonadjustable spacers is that they are necessarily very large and bulky, thus presenting problems of storage and shipping. In addition, the overall assembly must be sufficiently lightweight so that its weight does not unduly interfere with the predetermined drape of the lines or impose an undue burden thereon; conversely, the spacer must be of sufficient strength to withstand the substantial mechanical shocks and other forces exerted on the same when adjacent conductors tend to move relatively and particularly toward and away from each other.

Therefore, there is a need in the art for a strong, relatively lightweight midspan spacer that is rigid enough to maintain a plurality of proximal conductors in required aligned, spaced relationship during adverse weather or short circuit conditions while allowing necessary controlled movement thereof relatively under normal operating conditions, and which may be adjusted as necessary in the field to meet different uses and conductor conformations.

SUMMARY

Accordingly, it has been discovered that the aforementioned problems can be overcome by providing an adjustable midspan spacer which is capable of maintaining a plurality of proximal high voltage conductors in normal, predetermined spaced relationship under widely varying ambient conditions. The assembly broadly comprises means for attaching each conductor of a multi-conductor span with a common spacing assembly disposed within the space between the conductors. The spacing assembly is constructed from a plurality of adjustably interconnected spacer bars composed of lightweight, strong insulative material. The bars are interconnected by means of centrally disposed, adjustable connection structure to define an open spacing assembly of predetermined configuration, depending upon the ultimate use.

In preferred embodiments, clamp structures are employed which include a saddle clamp in gripping engagement with the conductor and having a generally U-shaped yoke structure supporting the saddle clamp while allowing pivoting movement thereof about an axis extending transversely of the conductor; and an elongated, circumferentially skirted insulator interposed between the yoke structure and the spacer bars, the latter being attached to the end of the insulator remote from the yoke structure. In other embodiments, the attachment means can include grooved knobs which are fixedly secured to the conductors by means of conventional line ties.

In accordance with the invention, the spacer bars may be used to provide a variety of spacing assemblies. In preferred embodiments a single spacer bar is positioned in disposition extending inwardly from each of the clamp structures associated with the respective conductors, with all of the bars adjustably interconnected at a single hub point within the space between the conductors, thereby presenting an "open" spacing assembly.

If, for example, it is desired to space three proximal conductors, the described spacer would produce an adjustable "wye" configuration.

The preferred adjustable connection assemblies for use in the invention comprise connection ferrules on the innermost ends of the elements to be connected, the ferrules being provided with axially projecting, apertured segments. The respective apertures are adapted to mate in transverse axial alignment and bolt means or the like are provided which extend through the mated apertures and complete the connection. In other preferred embodiments the segments each have a series of teeth about the aperture thereof which extend radially inwardly from the periphery of the segment. The teeth of the respective segments are adapted to interengage, thereby facilitating adjustable connection of the various components.

The elongated, insulative spacer bars can be constructed of any material that has sufficient mechanical strength and is lightweight, but it is preferred that such bars be composed of fiber glass reinforced epoxy rods jacketed with an insulative layer of epoxy material. Similarly, the skirted insulators may likewise be fabricated from such materials or equivalents thereto such as porcelain in order to provide maximum electrical insulation characteristics with minimization of the weight of the overall midspan spacer. In preferred forms, these components are cast from a thermosetting, synthetic resin such as an epoxy material.

DRAWING

DETAILED DESCRIPTION

Figure 1:
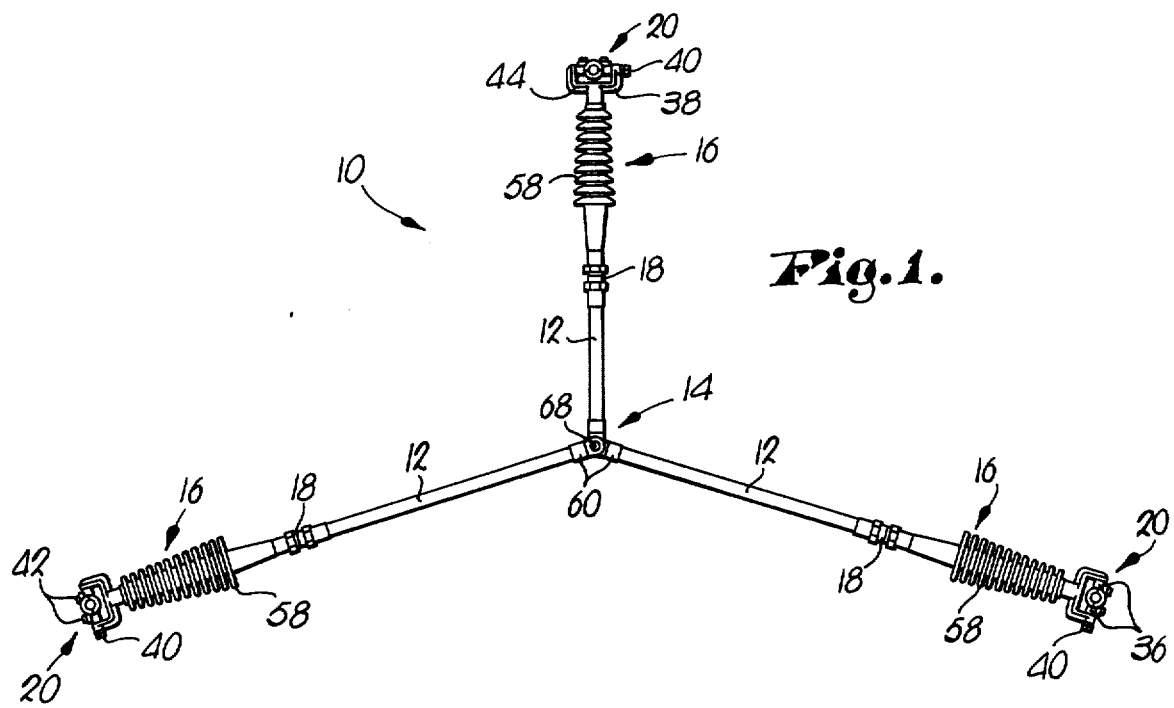
FIG. 1 is a front elevational view of a midspan spacer in accordance with the invention, showing an open "wye" configuration.

An adjustable, open configuration midspan spacer 10 is illustrated in FIG. 1 in elevation. In general, spacer 10 includes a plurality of elongated, essentially identical spacer bars 12 which are interconnected at a central hub point by means of an adjustable connection assembly 14 later to be described and extend radially outwardly to present a generally planar assembly. In addition, each bar 12 has an elongated, skirted insulator rigidly and axially affixed to the outermost end thereof by means of conventional coupling structure 18. Finally, conductor gripping clamp structure generally referred to by the numeral 20 is mounted on the outermost end of each insulator 16 and is operable to grip an elongated conductor. Assembly 10 as illustrated in FIG. 1 presents an open "wye" configuration with each of the aforementioned spacer bars serving to connect and space three adjacent conductors.

Figure 2:
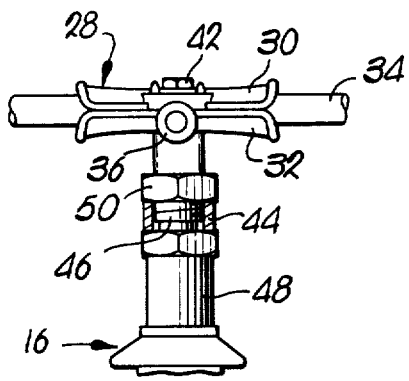
FIG. 2 is a fragmentary, side elevational view partially in section and illustrating the preferred conductor gripping saddle clamp assembly secured to an elongated conductor.

Referring now to specific details of the invention, FIGS. 1 and 2 illustrate the preferred conductor gripping clamp structure 20. Each of the latter comprises a trunion-mounted saddle clamp 28 which includes a pair of elongated, opposed, grooved gripping elements 30 and 32 which are adapted to cooperatively grip a conductor 34 in the manner best shown in FIG. 2. Conductor gripping element 32 includes integral, transversely extending axle defining members 36 which serve as a support for clamp 28. In the latter regard, each clamp structure 20 also includes a generally U-shaped yoke member 38 which is affixed to the respective insulators 16. The axle defining elements 36 extend transversely between the spaced, upstanding legs of yoke 38 and are pivotally maintained therein by means of fastening means 40. As best illustrated in FIG. 2, upper gripping element 30 is removably located in opposed relationship to member 32 in order to grip conductor 34, with bolts 42 serving to tighten the conductor gripping elements together around the conductor.

Each yoke member 38 is apertured at approximately the midpoint of its transverse bight portion 44 and is slipped over an upstanding, threaded post portion 46 of ferrule 48 which, in turn, is integrally attached to the outermost end of a corresponding insulator 16. Connection of the respective yoke structures 38 is completed by provision of a nut 50 operatively positioned on the end of the threaded portion of ferrule 48. As can be seen from a study of the figures, structure 20 is constructed so that saddle clamp is pivotal only about an axis extending generally transversely of the adjacent, gripped conductor.

In other embodiments, the clamp supporting yoke structure can be an integral, generally wye-shaped member with a hollow leg adapted to be attached to an unthreaded, upstanding portion of insulator 16. In such instances, the yoke members are preferably attached by gluing the yoke onto insulator 16 with epoxy or the like.

Figure 7:
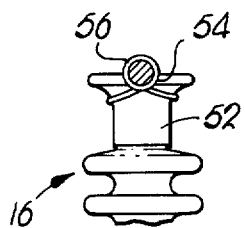
FIG. 7 is a fragmentary, elevational view depicting a grooved, knob-like conductor-gripping fixture secured to a skirted insulator, with a conductor operatively seated and retained within the fixture.

Connection structure 20 described above constitutes the most preferred embodiment of the present invention primarily by virtue of the inherent adjustability and the excellent mechancial connection obtained through the use thereof. However, in other instance (see FIG. 7) a knob 52 or other like member which is grooved for reception of a conductor can be employed in conjunction with well-known line ties. In such a case, the conductor is seated within the groove 54 and is tensionably retained therein by line tie 56 to form a secure connection therebetween.

As described above, each insulator 16 is provided with a series of spaced, circumferentially extending, transverse skirts 58 along the length thereof in order to increase the current leakage path along the surface of the insulator. These skirts can be tapered downwardly as illustrated in the uppermost insulator of FIG. 1, or they can be configured in substantially parallel relationship. As is well-known in the art, the tapered configuration is often choosen for the insulator positioned atop the assembly in order to assure rapid drainage of rainwater or other moisture from the body of the insulator and to increase the flashover resistance of the same. Similarly, the untapered configuration employed in the lower insulators ensures that moisture quickly and easily runs off the insulator body without collecting.

Figure 5:
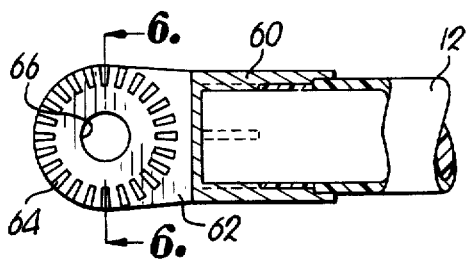
FIG. 5 is a fragmentary, side elevational view partially in section showing the innermost connection end of an elongated spacer bar which includes an apertured, toothed connection ferrule integrally connected thereto.

Adjustable connection assembly 14 includes a lightweight metallic connection ferrule 60 attached to the innermost end of the respective spacer bars 12. This attachment can be effected by threadably mounting the ferrules on the respective bars 12 or by bonding the components together with epoxy adhesive material. Each connection ferrule 60 has an axially projecting, apertured, flattened integral segment 62. The outermost end of each segment 62 is of semicircular configuration as best illustrated in FIG. 5. In addition, each segment 62 is provided with a circularly arranged series of spaced, radially disposed teeth 64 which project from the opposed, generally flat faces thereof. Each set of teeth 64 is positioned adjacent the circular periphery of the corresponding segment and extends inwardly from the circular edge thereof.

Figure 3:
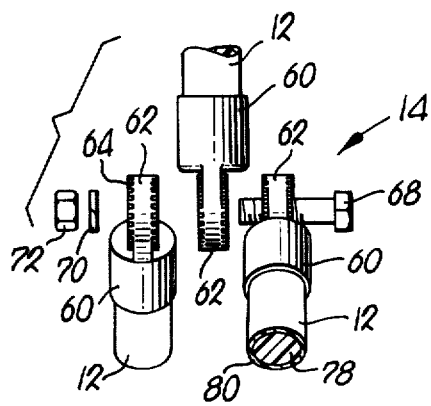
FIG. 3 is a fragmentary, exploded view depicting a preferred, central adjustable connection assembly for interconnecting the elongated spacer bars of the present invention.
Figure 6:
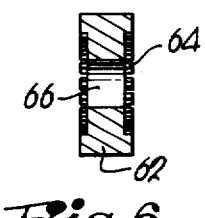
FIG. 6 is a vertical sectional view taken along line 6—6 of FIG. 5 and illustrating the apertured, toothed portion of a connection ferrule.

Referring specifically to FIG. 3, assembly 14 is depicted in exploded relationship, showing the respective ferrules 60 along with the other components of the overall assembly. The teeth on respective segments 62 are configured and arranged to mate when placed in an opposed, meshing relationship, thereby positioning the respective apertures 66 thereof in transverse axial alignment while releasably restricting the relative rotation between the interconnected bars 12. Coupling means in the nature of bolt 68 extends through the mated apertures 66 and is held in place by a lockwasher 70 and nut 72.

Because of the diameters of the respective spacer bar ferrules 60, it is sometimes difficult to position an adjacent pair of spacer bars with a small acute angle therebetween as could be required in specific situations. In such a case it has been found advantageous to interpose an annular disc-like spacer element 74 having teeth on the opposed flat faces thereof between the segments 62 of the adjacent spacer bars. In practice, the opposed sets of teeth on the respective faces of spacer 74 are offset relatively such that the teeth on one face thereof are aligned with the spacings between teeth on the opposed face. In this way, the ferrules 60 are sufficiently spaced apart to reduce any interference therebetween and the interconnected bars 12 are movable to form smaller acute angles at the point of their connection due to the offset of the teeth.

Figure 4:
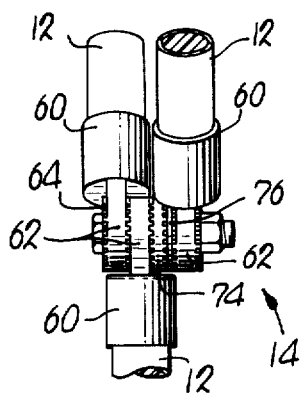
FIG. 4 is a fragmentary, side elevational view showing another embodiment of the central connection assembly.

As can be appreciated, by virtue of the meshing of the teeth of respective segments 62, the spacer bars 12 can normally only be connected with certain specific angles therebetween. That is, because the teeth of the respective segments are placed at predetermined points about the periphery thereof, only angles corresponding to the specific positions of these teeth are obtainable. If angles not in such correspondence are desired for a particular application, a conventional, relatively thin apertured washer 76 (see FIG. 4) can be interposed between one set of the tooth interengaging surfaces of connection assembly 14. In this way, the teeth thereof are precluded from meshing and the adjacent bars can be adjusted to form angles not normally obtainable. By employing washer 76, the connection assembly can be modified to any desired angle between the spacer bars. It has been found that the use of a single washer 76 for precluding interengagement of a pair of toothed segments 62 normally meshed together does not appreciably detract from the overall mechanical strength of connection assembly 14. Thus, it is possible to achieve substantially any desired orientation of the respective bars in the plane of assembly 10 while maintaining the mechanical integrity of the latter.

As discussed above, the spacer bars 12 for use in this invention must possess good electrical insulating capabilities and also have sufficient mechanical strength to maintain the predetermined spaced relationship of the conductors under extreme weather conditions and relatively high compression loads. Moreover, they must be sufficiently lightweight so that undue stress is not placed upon the conductors at midspan, thus distorting the desired drape or spacing relationship thereof. In accordance with the invention, it has been found that insulative spacer bars composed of a fiberglass reinforced epoxy core 78 jacketed with a layer of epoxy material 80 can advantageously be employed. Such bars are extremely efficient insulators, are light in weight and are extremely strong and rugged.

In practice, it has been found that an epoxy composition including 2, 2-bis (p-hydroxyphenyl) propaneglycidyl ether polymer, from 15 to 65% by weight of an aliphatic polyglycidyl ether or ester, and from 0.01 to 3% by weight of an alkylidene bis, tris, or polyphenol is particularly advantageous when used to form at least the outer jacket portion of the spacer bars as well as insulators 16.

By virtue of the fact that only a single adjustable connection is required in the spacers of the present invention, bars 12 are preferably threadably secured to the respective insulators 16 by means of the conventional coupling structure 18. In practice, the overall spacer bars including the insulators 16 and conductor gripping structures 20 are manufactured as a unit so that the entire apparatus can be shipped as three separate, elongated components along with the associated connection structure described above.

It will be readily apparent from the foregoing that each of the bars 12 can be individually adjusted in the plane of the open spacing assembly 10 to conform to a given conductor arrangement. This is accomplished simply by loosening bolt 68 and rotating respective bars 12 as needed to provide the desired spacing orientation, whereupon bolt 68 is retightened. Moreover, by virtue of the fact that the open configuration spaces hereof require a lesser number of individual bars and connection hardware than is required with other adjustable midspan spacers, the spacers of the present invention are generally less expensive and lighter in weight. These advantages obtain notwithstanding the fact that present open configuration spacers are fully adjustable and able to maintain proximal conductors in proper relative relationship under substantially all ambient conditions encountered in use.

A prime feature of the present invention results from the fact that the individual components which make up the assemblies can be stored, shipped and used individually. Thus, the manufacturer or electrical utility can store spacer bars or the like of given dimensions in accordance with their needs, and can utilize the latter in conjunction with previously installed midspan spacers which require replacement of only some individual parts thereof. Hence, repair and maintenance costs are substantially reduced because the necessity of replacing the entire spacer is avoided when only a particular component thereof fails.

Another particularly important aspect of the present invention stems from the fact that the preferred conductor gripping structures 20 are pivotally mounted to allow restricted relative motion thereof during normal operating conditions, while restraining undue motions and vibrations under deleterious weather conditions or during short circuits or transient voltage surges.

Having thus described the invention, what is claimed as new and desired to be secured by Letters Patent is:

1. An adjustable midspan spacer for maintaining proximal high voltage conductors in spaced relationship, comprising:
    a plurality of elongated, insulative spacer bars corresponding in number to said conductors and having means on the outer ends thereof adapted to grippingly engage one of said conductors;
    means interconnecting said spacer bars at the ends thereof remote from said conductor-gripping ends to present an open, generally planar spacing assembly of dimensions permitting the same to be positioned within the space between said conductors,
    said interconnecting means including structure for locking said spacer bars at desired orientations in the plane of said assembly and being releasable to permit selective pivotal movement of the spacer bars about the point of interconnection of the same and in the plane of said spacing assembly.

2. The midspan spacer of claim 1, wherein the conductor-gripping end of each of said spacer bars includes an elongated insulator axially mounted on said bar and including a series of spaced, circumferentially extending skirts along the length thereof, each of said insulators having conductor-gripping means on the end thereof remote from said spacer bar.

3. The midspan spacer of claim 2, wherein said conductor-gripping means comprises a saddle clamp adapted to grippingly engage one of said conductors and provided with a generally U-shaped yoke structure supporting said saddle clamp and allowing pivoting movement thereof only about an axis extending transversely of said conductor.

4. The midspan spacer of claim 2 wherein said conductor-gripping means comprises a grooved knob member configured to receive one of said conductors therein.

5. The midspan spacer of claim 1, wherein said interconnecting means comprises:
    a ferrule secured to the innermost end of each spacer bar, each of said ferrules being provided with an axially extending, transversely apertured segment,
    the segments of adjacent ferrules being in abutting relationship with the apertures thereof in axial alignment,
    the abutting faces of adjacent ferrule segments being of generally flat configuration and provided with spaced, outwardly projecting teeth arranged in a circular pattern and in meshing engagement with the teeth of an opposed segment for interlocking adjacent ferrules; and
    releasable mechanism extending through the aligned apertures of abutting ferrule segments to releasably interconnect the same.

6. The midspan spacer of claim 1 wherein said spacer bars are formed of fiber glass reinforced epoxy core rod jacketed with a coating of insulative epoxy material.

* * * * *